United States Patent
Chu et al.

(10) Patent No.: US 6,550,787 B1
(45) Date of Patent: Apr. 22, 2003

(54) CONVEYING APPARATUS FOR ASCENDING OR DESCENDING STAIRWAYS

(75) Inventors: Chia-Chun Chu, Taipei (TW); Puu-An Juang, Tai-Ping (TW); Hong-Sen Yan, Tai-Nan (TW)

(73) Assignee: Aerospace Industrial Development Corp., Taichung (TW)

( * ) Notice: Subject to any disclaimer, the term of this patent is extended or adjusted under 35 U.S.C. 154(b) by 0 days.

(21) Appl. No.: 10/029,296

(22) Filed: Dec. 28, 2001

(51) Int. Cl.[7] .............................. A61G 5/06; B62B 5/02
(52) U.S. Cl. ........................ 280/5.28; 180/8.2; 180/8.3; 280/DIG. 10
(58) Field of Search .............................. 280/5.26, 5.28, 280/5.2, DIG. 10; 180/907, 8.2, 8.3, 901

(56) References Cited

U.S. PATENT DOCUMENTS

| | | | | |
|---|---|---|---|---|
| 3,283,839 A | * | 11/1966 | Brown et al. ................ | 180/8.2 |
| 3,450,219 A | * | 6/1969 | Fleming ...................... | 180/8.2 |
| 3,515,401 A | * | 6/1970 | Gross .......................... | 180/8.2 |
| 3,580,344 A | * | 5/1971 | Floyd .......................... | 180/8.2 |
| 3,638,745 A | * | 2/1972 | Floyd .......................... | 180/8.2 |
| 4,709,772 A | * | 12/1987 | Brunet ........................ | 180/8.2 |
| 4,790,548 A | * | 12/1988 | Decelles et al. ............. | 180/6.5 |
| 5,263,547 A | * | 11/1993 | Alber .......................... | 180/357 |

* cited by examiner

*Primary Examiner*—Anne Marie Boehler
(74) *Attorney, Agent, or Firm*—Bacon & Thomas, PLLC

(57) ABSTRACT

A conveying apparatus capable of ascending or descending stairways and carrying goods consists of a frame, a transmission mechanism and a driving mechanism located on a lower section of the frame. The transmission mechanism includes a planetary gear set and is with two degrees of freedom. When moving on the floor, the driving mechanism may drive a driving wheel in the transmission mechanism to deliver output of the conveying apparatus based on floor conditions, thereby to ascend or descend the stairways, or moving on the plain floor.

2 Claims, 9 Drawing Sheets

CONVEYING APPARATUS FOR ASCENDING OR DESCENDING STAIRWAYS

FIELD OF THE INVENTION

The present invention relates to a conveying apparatus and particularly a conveying apparatus that employs gear mechanisms to ascend or descend stairways, or moving on plain floors.

BACKGROUND OF THE INVENTION

Conveying apparatus are auxiliary equipment to substitute human labor for transporting or moving people or goods from one location to another location. They are widely used to benefit people's life and work, such as wheelchairs, goods carriers, etc. When utilizing the conveying apparatus for transporting use, they often encounter a problem of confronting obstacles (such as stairways) and cannot pass through or stride over, and result in not able to function properly.

Take the commonly used wheelchairs for example; they are widely used transportation means to aid disabled people moving around. The general wheelchairs can move smoothly on the plain floor, but are difficult to move on uneven ground surface. Hence to develop conveying means to allow wheelchairs capable of ascending or descending stairways has been a highly pursued goal in the industry. Conventional conveying apparatus to aid the wheelchair moving up or down stairways generally employ one set of electric driven device installed externally on the wheelchair. When confronting a stairway, a chain is driven to move two sets of eccentric wheels to ascend or descend the stairway. A safety device consisting of two sets of wheels and chain sets is provided to prevent the wheelchair from falling down. They have a disadvantage of not able to self-activate the electric driven device when encounter obstacles. Users have to control the electric driven device. Moreover, conventional conveying apparatus utilize specially designed wheels to ascend or descend the stairway and totally rely on manpower to drive the conveying apparatus. Hence they cannot carry too much loads. In addition, conventional conveying apparatus generally do not have contingent measures in the events of electric power supply malfunction or shortage during descending stairways. It could injure people or damage goods being carried if such an incident occurred.

Based on above discussions, it is clear that there are still many problems for conventional conveying apparatus, particularly their not able to automatically determine if encountering obstacles and proceed ascending or descending the stairway, lack of contingent measures when power supply is interrupted, and not adequate power to carry heavy loads.

SUMMARY OF THE INVENTION

The primary object of the invention is to provide a conveying apparatus that is capable of automatically determining if encountering obstacles and proceeding ascending or descending stairways to resolve the problem of requiring operators to determine if encountering obstacles to proceed ascending or descending stairways.

Another object of the invention is to provide a conveying apparatus that is capable of descending safely to a plain floor by means of manpower input when electric devices are malfunction.

A further object of the invention is to provide a conveying apparatus that is simply structured and easy to assemble, and is capable of carrying various goods to ascend stairways, descend stairways, or move on plain floors.

In order to achieve the foregoing objects, the conveying apparatus of the invention consists of a frame, a transmission mechanism and a driving mechanism located on a lower section of the frame. The transmission mechanism includes a sun gear set, a planetary gear set, a driving wheel, a second gear set and a carrier. The driving mechanism is located separately. When the conveying apparatus is moving up on a stairway, the driving mechanism drives the driving wheel. The wheel encounters resistance of the stair steps and functions as an anchor bar. Force is transferred from the transmission mechanism to a connection plate of the carrier for output to generate an action of striding over the stair step and moving to an upper stair step. When the conveying apparatus is descending the stairway, the driving mechanism drives the driving wheel, and the transmission mechanism self selects a rod element which uses less power for output. The force is transferred through the transmission mechanism for output by wheels or the carrier or both depending on which approach requires less power. When the conveying apparatus is descending and the driving mechanism has malfunction, a handle may be used to provide a thrust force to allow the conveying apparatus moving down safely to a plain floor by means of gravity force of the conveying apparatus. When moving on the plain floor, the driving mechanism may drive the driving wheel, and the carrier remains stationary, and the force may be output through the transmission mechanism and wheels.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
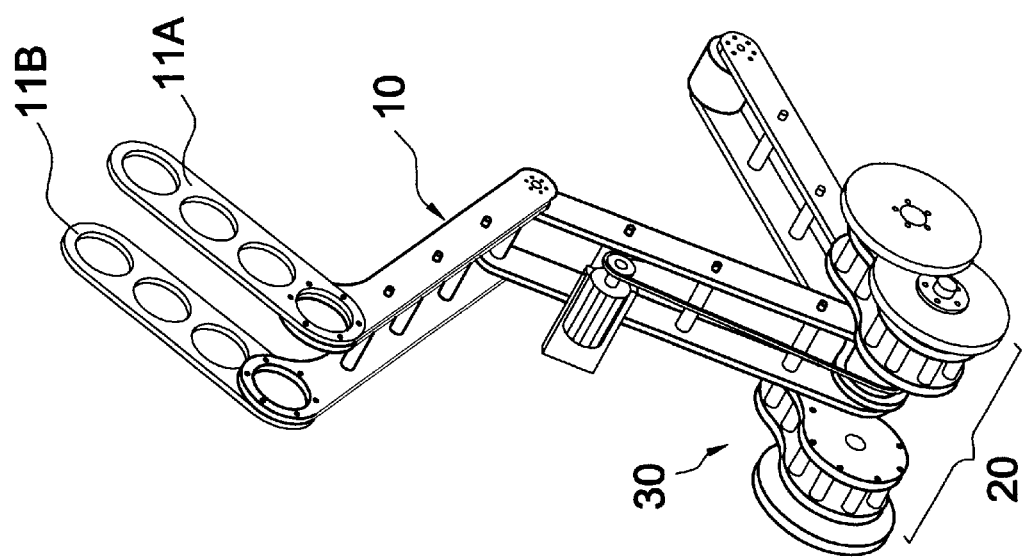
FIG. 1 is a schematic view of the conveying apparatus of the invention.
Figure 2:
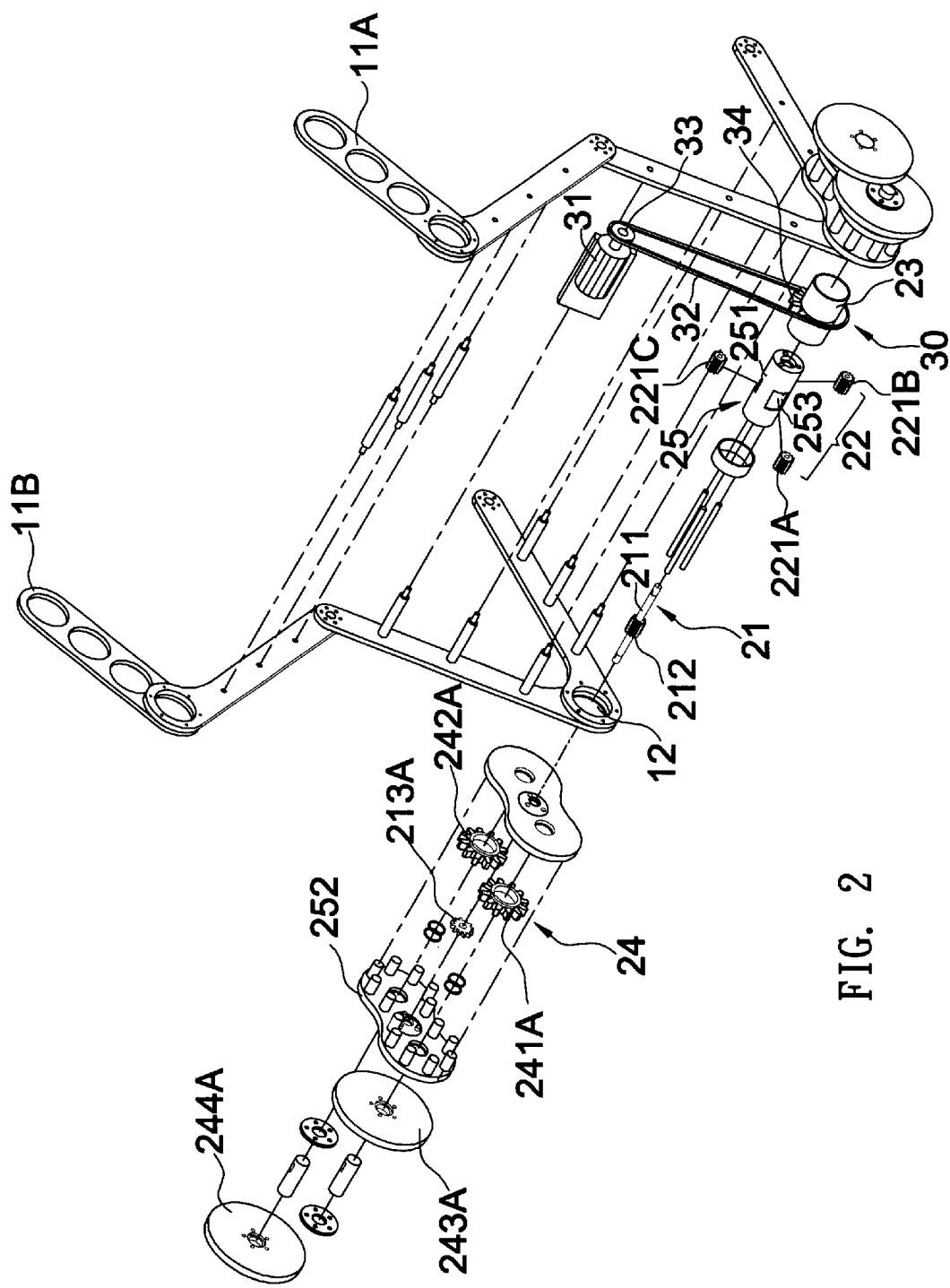
FIG. 2 is an exploded view of the conveying apparatus of the invention.

Referring to FIGS. 1 and 2, the conveying apparatus of the invention consists of a frame 10, a transmission mechanism 20 and a driving mechanism 30 located on a lower section of the frame 10. There are a pair of handles 11A, 11B located at an upper section of the frame 10 to receive human power input.

Figure 3:
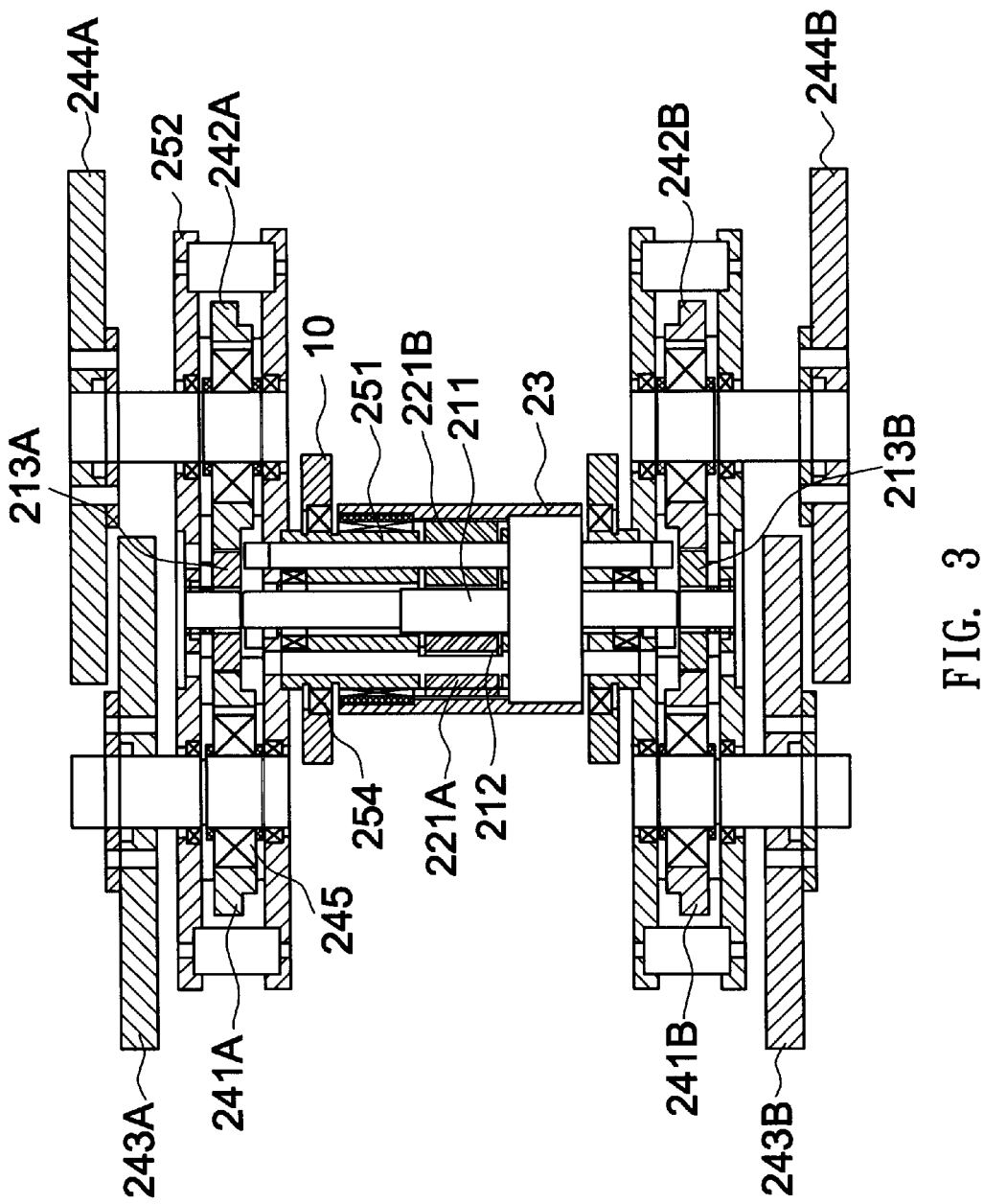
FIG. 3 is a schematic sectional view of a transmission mechanism for the conveying apparatus of the invention.
Figure 4A:
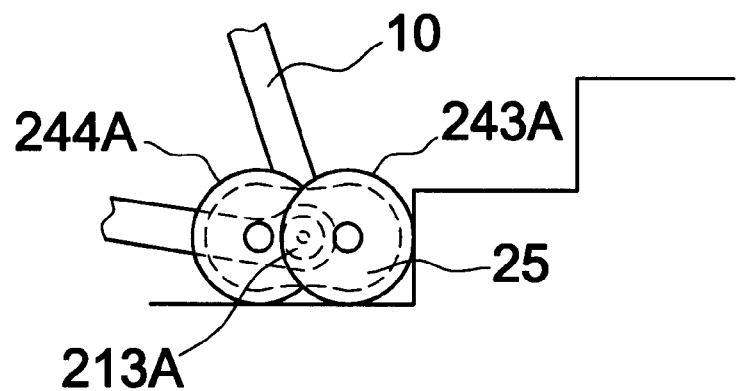
FIGS. 4A through 4E are schematic views of the invention, for ascending a stairway.
Figure 4B:
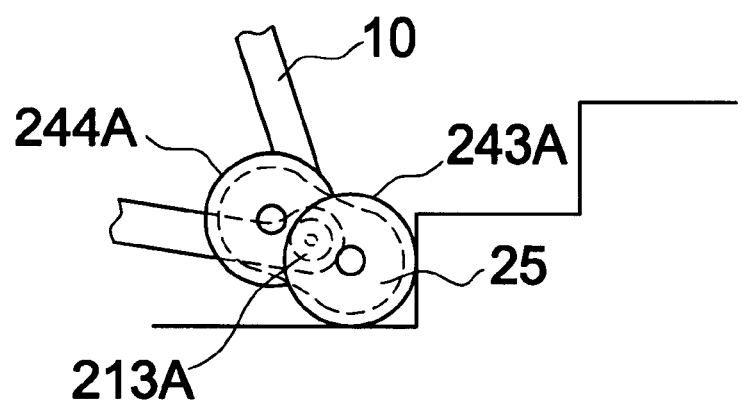
Figure 4C:
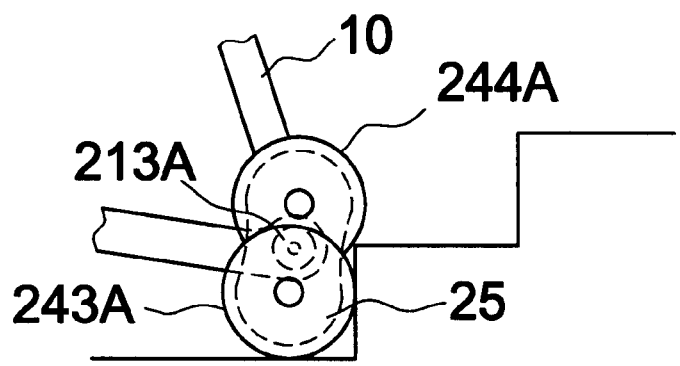
Figure 4D:
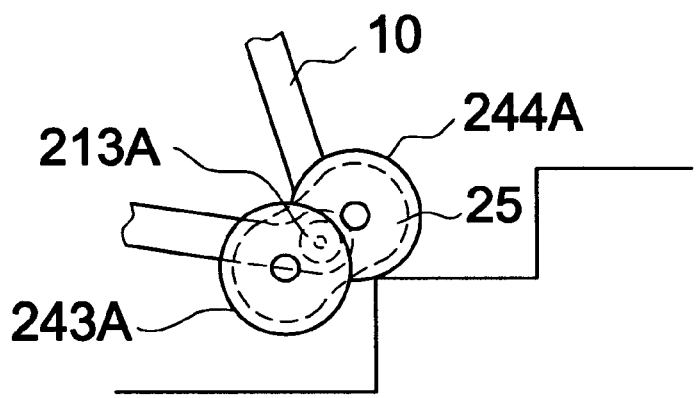
Figure 4E:
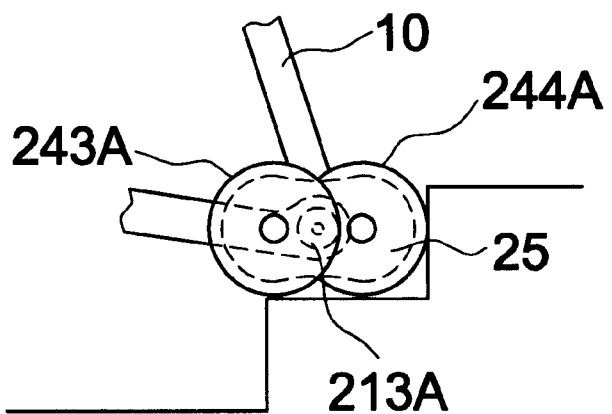
Figure 5A:
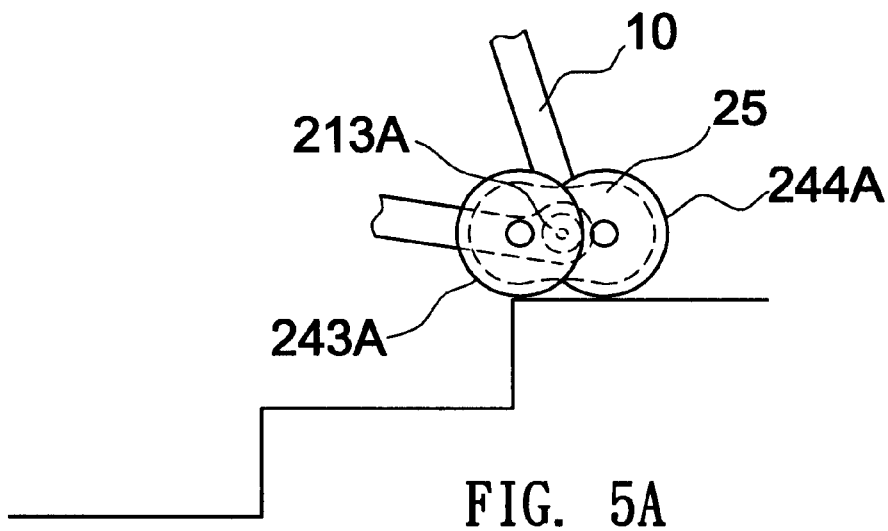
FIGS. 5A through 5E are schematic views of the invention, for descending a stairway.
Figure 5B:
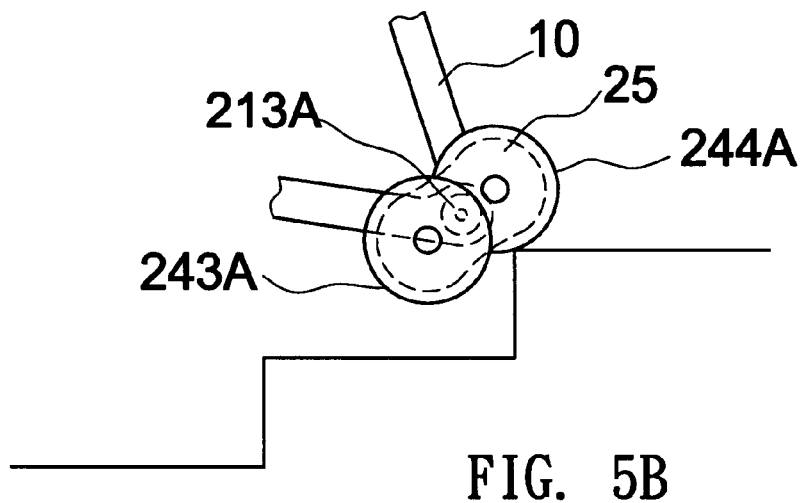
Figure 5C:
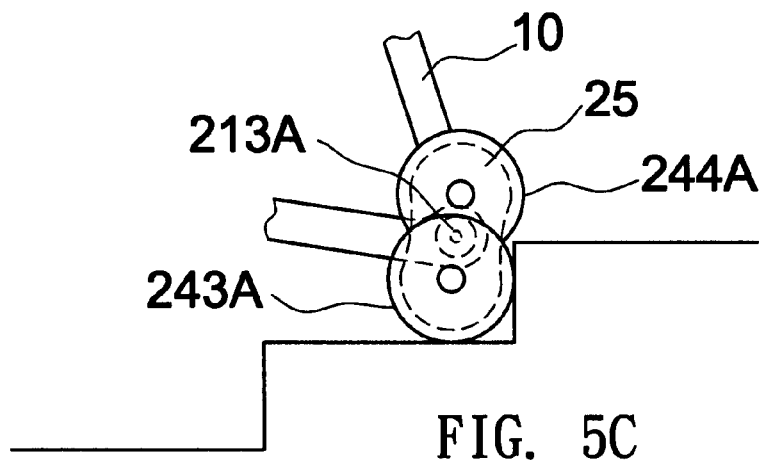
Figure 5D:
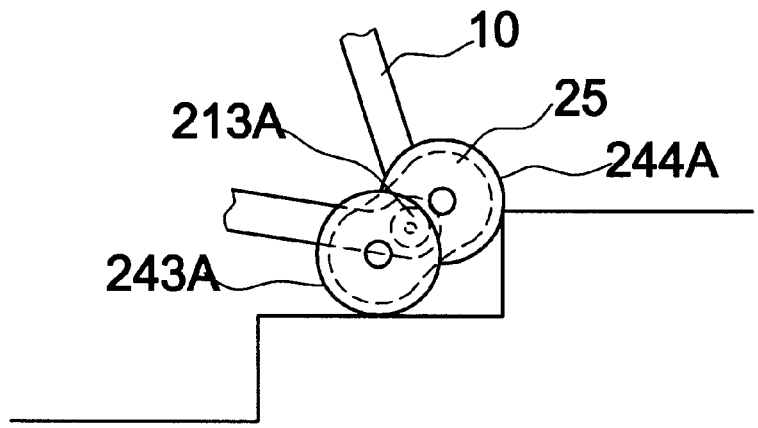
Figure 5E:
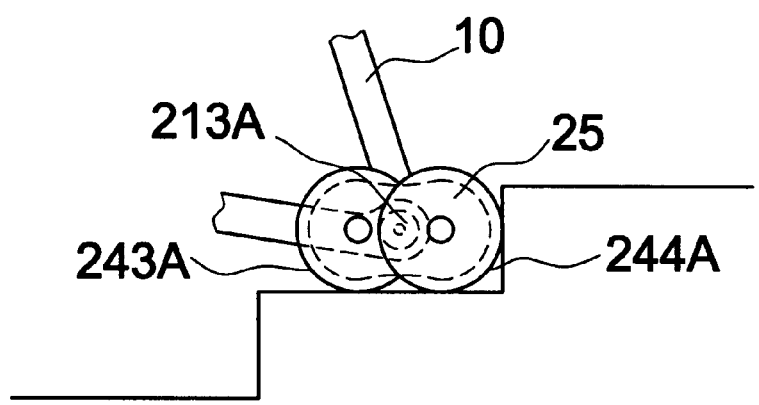

Referring to FIG. 3, the transmission mechanism 20 includes a sun gear set 21, a planetary gear set 22, a driving wheel 23, a second gear set 24 and a carrier 25. The sun gear set 21 includes a sun gear spindle 211, a sun gear 212 mounted on the periphery of the sun gear spindle 211, and a pair of first gears 213A, 213B. The sun gear spindle 211 may be rotated about the frame 10. The planetary gear set 22 is located on the periphery of the sun gear 212 and includes a plurality of planetary gears meshing with the sun gear 212. In an embodiment of the invention, three planetary gears (221A, 221B, 221C) are used. The driving wheel 23 is a ring gear rotating about the sun gear spindle 211 and meshes with the planetary gears 221A, 221B, 221C. The second gear set 24 includes two sets of second gears 241A, 242A, 241B, 242B located on the periphery of each first gear 213A, 213B. In the embodiment, the second gears 241A, 242A are located on the periphery of the first gear 213A, and the second gears 241B, 242B are located on the periphery of the first gear 213B. And every one of the second gears 241A, 242A, 241B, 242B is meshed with its corresponding first gear 213A, 213B. In the embodiment, the second gears 241A, 242A are meshed with the first gear 213A, and the second gear 241B, 242B are meshed with the first gear 213B. Furthermore, every second gear 241A, 242A, 241B, 242B drives a wheel 243A, 244A, 243B, 244B to rotate. In the embodiment, the second gear 241A drives the wheel 243A, the second gear 242A drives the wheel 244A, the second gear 241B drives the wheel 243B, and the second gear 242B drives the wheel 244B. The carrier 25 is pivotally mounted on the sun gear spindle 211 and drives the spindles of the planetary gears 221A, 221B, 221C and the second gears 241A, 242A, 241B, 242B rotating about the sun gear spindle 211 which serves as the axis of rotation. The driving mechanism 30 is constructed by the elements set forth above, and may drive the driving wheel 23 to move the conveying apparatus ascending or descending stairways, and to move on plain floors. The driving mechanism 30 may also include a motor 31 fixedly mounted to the frame, a chain 32 and a first chain wheel 33, and a second chain wheel 34 located on an outer rim of the driving wheel 23. The motor 31 may drive the first chain wheel 33 which moves the chain 32, and the chain 32 drives the second chain wheel 34 for driving the driving wheel 23 to rotate.

Referring to FIG. 2 for fabrication and assembly of the invention, the carrier 25 includes a casing 251 and two pairs of connection plates 252. The periphery of the casing 251 has window openings 253 corresponding to the number of the planetary gears 221A, 221B, 221C to accommodate the planetary gears 221A, 221B, 221C for meshing with the sun gear 212. The second gears 241A, 242A, 241B, 242B are mounted respectively on the spindles of the wheels 243A, 244A, 243B, 244B through an one-way bearings 245 to allow the second gears 241A, 242A, 241B, 242B driving the wheels 243A, 244A, 243B, 244B. The one-way bearings 245 allows the second gears 241A, 242A, 241B, 242B meshing with the wheels 243A, 244A, 243B, 244B in only one direction. Such a construction allows the conveying apparatus turning easier, and also can prevent the conveying apparatus from turning reverse or incurring hazards. The frame 10 has a bottom section which has two anchor openings 12 formed with a diameter larger than the outer diameter of the casing 251 of the carrier 25. Referring to FIG. 3, the casing 251 of the carrier 25 may be housed in the anchor opening 12 and has a bearing 254 located between the casing 251 and the anchor opening 12 to allow the casing 251 rotating in the anchor opening 12.

The transmission mechanism 20 of the invention is a set of planetary gear mechanism with two degrees of freedom, and consists of three pairs of gear sets (the driving wheel 23 and the planetary gear set 22, the planetary gear set 22 and the sun gear 212, the first gear 213A and the second gear 241A) and six rod elements (the frame 10, sun gear set 21, carrier 25, driving wheel 23, planetary gear set 22, second gear set 24). As the transmission mechanism 20 is a planetary gear mechanism with two degrees of freedom, the movement of the transmission mechanism 20 can be completely controlled by adding two more external constraints. In the embodiment, the first external constraint is served by the driving mechanism 30 to drive the driving wheel 23, and the second external constraint is automatically added based on actual moving conditions of the transmission mechanism 20 on the floor to completely control the movement of the transmission mechanism 20.

Referring to FIGS. 4A through 4E for the conveying apparatus of the invention in use for ascending stair steps, the driving mechanism 30 is activated to drive the driving wheel 23 as the first external constraint, the wheels 243A, 243B are resisted by the stair step and serve as anchor rods and become the second constraint. Force is transferred from the driving wheel 23, through the planetary gears 221A, 221B, 221C, sun gear 212 and sun gear spindle 211, and finally output through the carrier 25 to generate movements of striding over the stair step and ascend the stair step. Referring to FIGS. 5A through 5E for the conveying apparatus of the invention in use for descending stair steps, the driving mechanism 30 is activated to drive the driving wheel 23 as the first external constraint, the wheels 243A, 243B, 244A, 244B and the carrier 25 do not encounter resistance from stair steps, hence the transmission mechanism 20 will self select a second external constraint as a force saving rod element to output. Force is transferred from the driving wheel 23, through the planetary gears 221A, 221B, 221C, sun gear 212 and sun gear spindle 211, and finally output through either of the wheels 243A, 243B, 244A, 244B and the carrier 25 whichever requires less force or both to generate movements for descending the stair steps. During the descending processes, if the driving mechanism 30 has malfunction, a thrust force may be applied on the handles 11A, 11B to allow the conveying apparatus moving down safely through its own gravity force.

When the conveying apparatus is moving on the plain floor, the driving mechanism 30 is activated to drive the driving wheel 23 as the first external constraint, the carrier 25 remains stationary and may serve as an anchor rod element and become the second constraint. Force is transferred from the driving wheel 23, through the planetary gears 221A, 221B, 221C, sun gear 212, first gears 213A, 213B and second gears 241A, 241B, 242A, 242B, and finally output through the wheels 243A, 243B, 244A, 244B for moving the conveying apparatus on the plain floor.

Figure 6:
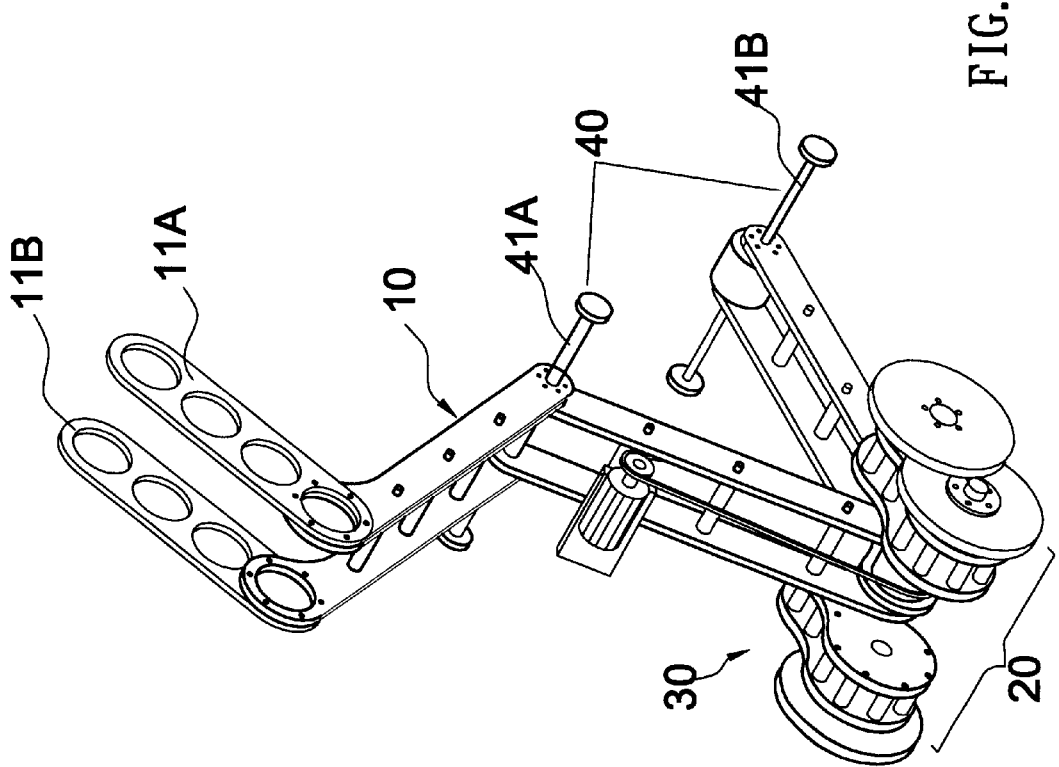
FIG. 6 is a schematic view of the invention coupled with an anchoring structure for a wheelchair.
Figure 7:
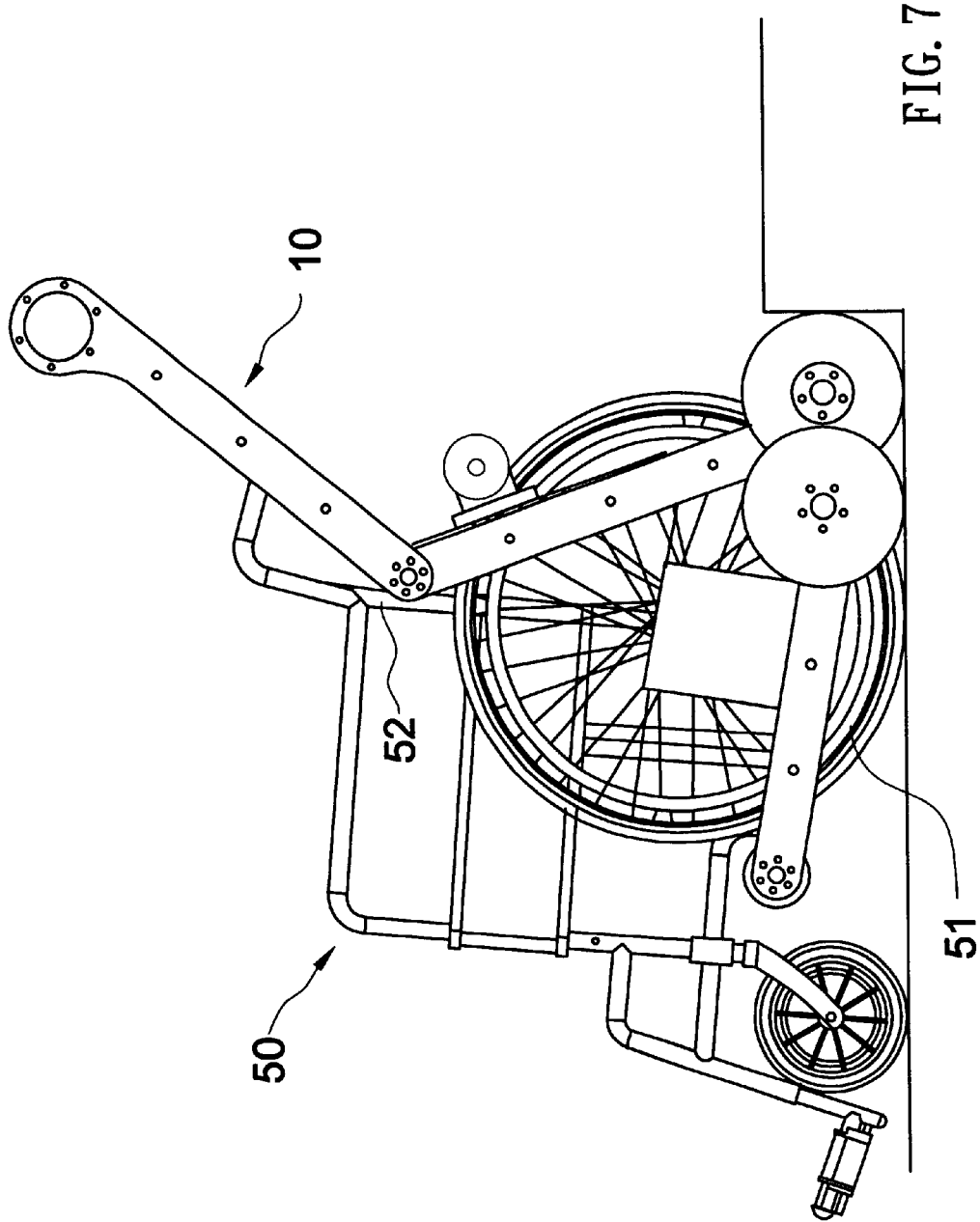
FIG. 7 is a schematic side view of the invention coupled with a wheelchair.

The frame 10 may be used to carry goods, and be equipped with an anchor structure 40 to hold the goods securely. Referring to FIGS. 6 and 7 for an example of coupling the conveying apparatus of the invention with a wheel chair, the anchor structure 40 includes two sets of support brackets 41A, 41B. The conveying apparatus may be pushed in through the rear side of the wheelchair 50, then the support brackets 41A, 41B may be fastened respectively to the large wheel 51 and an upper bracket 52 of the wheelchair for the conveying apparatus to support the loading. The wheelchair 50 thus constructed may be moved on the plain floor, or be moved to ascend or descend stairways.

What is claimed is:

1. A conveying apparatus for ascending or descending stairways, comprising:

a frame having an upper section with a pair of handles located thereon, and a transmission mechanism located on a lower section of the frame including a sun gear set, a planetary gear set, a driving wheel, a second gear set and a carrier, the sun gear set including a sun gear spindle, a sun gear mounting on the periphery of the sun gear spindle and a pair of first gears, the sun gear spindle being turnable about the frame, the planetary gear set being located on the periphery of the sun gear and including a plurality of planetary gears meshing with the sun gear, the driving wheel being a ring gear rotating about the sun gear spindle and meshing with the planetary gears, the second gear set including two sets of second gears, each set of second gears being on a periphery of each first gear for meshing respectively with the corresponding first gear, each of the second gears driving a wheel to rotate, the carrier being pivotally mounted on the sun gear spindle and driving spindles of the planetary gears and the second gears rotating about the sun gear spindle which serves as the axis of rotation, the carrier including a casing and two pairs of connection plates, the casing having window openings formed on the periphery thereof corresponding to the number of the planetary gears to accommodate the planetary gears for meshing with the sun gear; and wherein the driving mechanism drives the driving wheel to move the conveying apparatus ascending or descending the stairways, or running on plain floors.

2. A conveying apparatus for ascending or descending stairways, comprising:

a frame having an upper section with a pair of handles located thereon, and a transmission mechanism located on a lower section of the frame including a sun gear set, a planetary gear set, a driving wheel, a second gear set and a carrier, the sun gear set including a sun gear spindle, a sun gear mounting on the periphery of the sun gear spindle and a pair of first gears, the sun gear spindle being turnable about the frame, the frame includes a bottom section having two anchor openings formed with a diameter larger than the outer diameter of a casing of the carrier, the casing of the carrier being housed in the anchor openings and having a bearing located between the casing and the anchor openings to allow the casing to rotate in the anchor openings, the planetary gear set being located on the periphery of the sun gear and including a plurality of planetary gears meshing with the sun gear, the driving wheel being a ring gear rotating about the sun gear spindle and meshing with the planetary gears, the second gear set including two sets of second gears, each set of second gears being on a periphery of each first gear for meshing respectively with the corresponding first gear, each of the second gears driving a wheel to rotate, the carrier being pivotally mounted on the sun gear spindle and driving spindles of the planetary gears and the second gears rotating about the sun gear spindle which serves as the axis of rotation; and wherein the driving mechanism drives the driving wheel to move the conveying apparatus ascending or descending the stairways, or running on plain floors.

* * * * *